United States Patent
Hsieh et al.

(10) Patent No.: US 12,528,702 B2
(45) Date of Patent: Jan. 20, 2026

(54) METHOD OF MANUFACTURING MULTI-POROUS BIOMASS CARBON MATERIAL

(71) Applicant: CPC CORPORATION, TAIWAN, Kaohsiung (TW)

(72) Inventors: Tzu-Hsien Hsieh, Kaohsiung (TW); Chia-Yu Chang, Kaohsiung (TW); Chih-Yung Wu, Kaohsiung (TW); Yang-Chuang Chang, Kaohsiung (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 445 days.

(21) Appl. No.: 18/126,432

(22) Filed: Mar. 25, 2023

(65) Prior Publication Data

US 2024/0279063 A1 Aug. 22, 2024

(30) Foreign Application Priority Data

Feb. 16, 2023 (TW) .................. 112105499

(51) Int. Cl.
*C01B 32/05* (2017.01)
(52) U.S. Cl.
CPC .................... *C01B 32/05* (2017.08)
(58) Field of Classification Search
CPC ....... C01B 32/05; C01B 32/318; C01B 32/30; C01B 32/306; C01B 32/312; C01B 32/324; C01B 32/33; C01B 32/336; C01B 32/342; C01B 32/348; C01B 32/354; C01B 32/36; C01B 32/366; C01B 32/372; C01B 32/378; C01B 32/382; C01B 32/384; C01B 32/39; C01P 2006/80
See application file for complete search history.

(56) References Cited

PUBLICATIONS

Li, et al., Ultrahigh-surface-area activated carbon aerogels derived from glucose for high-performance organic pollutants adsorption, Journal of Colloid and Interface Science 2019; 546: 333-343 (Year: 2019).*
Suhas, et al., Lignin—from natural adsorbent to activated carbon: A review, Bioresource Technology 2007; 98: 2301-2312 (Year: 2007).*

* cited by examiner

*Primary Examiner* — Daniel C. Mccracken
(74) *Attorney, Agent, or Firm* — Maschoff Brennan

(57) ABSTRACT

Disclosed is a method of manufacturing a multi-porous biomass carbon material, comprising: a material preparation step of preparing a raw material mixture by evenly mixing a biomass carbon source and an oxidant at a stirring temperature; a reduction-oxidation step of heating the raw material mixture in an oxygen-deficient environment and making the raw material mixture undergo a reduction-oxidation reaction to obtain an original product; a first-pickling-drying step of pickling the original product to obtain a first-pickling product, performing a drying treatment thereon to obtain a dried product; a heat treatment step of heating the dried product at a heat treatment temperature in an oxygen-deficient thereby obtaining a volatile-component-removed product; and a second-pickling-drying step of making the second-pickling product become the multi-porous biomass carbon material.

8 Claims, 1 Drawing Sheet

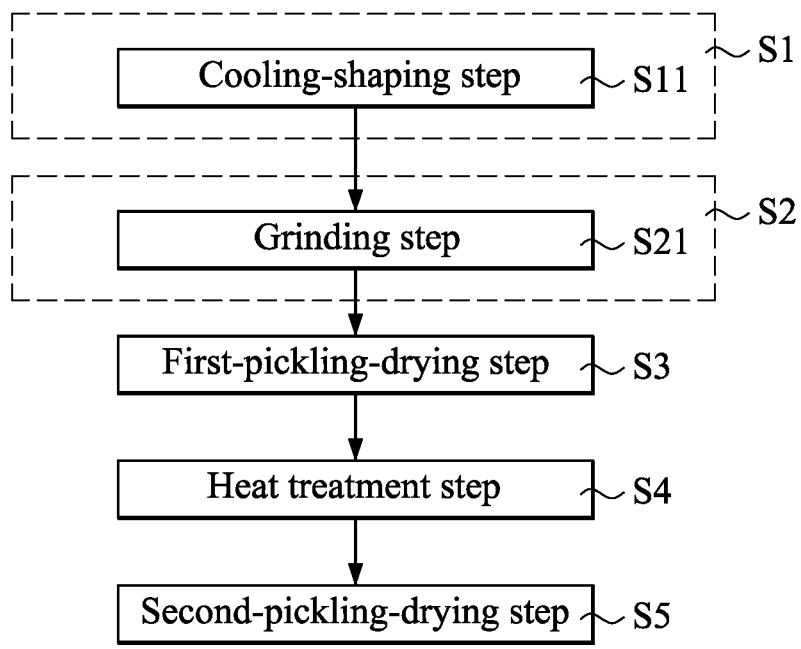

METHOD OF MANUFACTURING MULTI-POROUS BIOMASS CARBON MATERIAL

FIELD OF THE INVENTION

The present invention relates to a biomass carbon material and a method of manufacturing the same, and more particularly relates to a multi-porous biomass carbon material and a method of manufacturing the same.

BACKGROUND OF THE INVENTION

On average, Taiwan generates millions of metric tons of agricultural waste annually. However, most of these wastes were disposed of casually in the past, such as being buried or burned on site, and therefore they were not effectively reused. A biomass carbon material is a product produced by pyrolysis of biomass, which has both environmental and resource benefits in terms of carbon reduction, and in recent years, scientists around the world have discovered that agricultural wastes can be used as a raw material for the preparation of biomass carbon materials.

However, the process of preparing biomass carbon materials from agricultural wastes is time-consuming and energy-consuming, and it is difficult to enhance the economic value of biomass carbon materials prepared according to the conventional techniques. Therefore, there is still a need to improve the conventional preparation method.

SUMMARY OF THE INVENTION

Therefore, one objective of the present invention is to provide a multi-porous biomass carbon material and a method of manufacturing the same, which can effectively simplify the manufacturing process and enhance the economic value of the product.

In order to overcome the technical problems in prior art, the present invention provides a method of manufacturing a multi-porous biomass carbon material, comprising: a material preparation step of preparing a raw material mixture by evenly mixing a biomass carbon source and an oxidant at a stirring temperature, wherein the biomass carbon source is glucose or lignin, and the oxidant is potassium nitrate or ammonium nitrate; a reduction-oxidation step of heating the raw material mixture in an oxygen-deficient environment to cause the raw material mixture to spontaneously combust upon heating, thereby making the raw material mixture undergo a reduction-oxidation reaction to obtain an original product; a first-pickling-drying step of pickling the original product to obtain a first-pickling product, washing the first-pickling product with deionized water to a neutral pH value, and then performing a drying treatment thereon to obtain a dried product; a heat treatment step of heating the dried product at a heat treatment temperature in an oxygen-deficient environment to remove residual volatile components of the dried product, thereby obtaining a volatile-component-removed product; and a second-pickling-drying step of pickling the volatile-component-removed product to obtain a second-pickling product, washing the second-pickling product with deionized water to a neutral pH value, and then performing the drying treatment thereon to make the second-pickling product become the multi-porous biomass carbon material.

In one embodiment of the present invention, the method is provided further comprising, between the material preparation step and the reduction-oxidation step, a cooling-shaping step of cooling and shaping the raw material mixture by putting the raw material mixture into a quartz tube to obtain a cooled-shaped raw material mixture, and wherein in the reduction-oxidation step, the cooled-shaped raw material mixture undergoes the reduction-oxidation reaction to obtain the original product.

In one embodiment of the present invention, the method is provided further comprising, between the reduction-oxidation step and the first-pickling-drying step, a grinding step of grinding the original product to obtain a ground product, and wherein in the first-pickling-drying step, the ground product is pickled to obtain the first-pickling product, which is then dried to obtain the dried product.

In one embodiment of the present invention, the method is provided, wherein in the material preparation step, the biomass carbon source and the oxidant are evenly mixed in a manner of direct mixing of powder or in a manner of solvent-assisted mixing to obtain the raw material mixture, wherein water or alcohol is used as a solvent in the manner of solvent-assisted mixing.

In one embodiment of the present invention, the method is provided, wherein the mass percentage concentration of the biomass carbon source of the raw material mixture is 10-90 wt % and the oxidant of the raw material mixture is 10-90 wt %.

In one embodiment of the present invention, the method is provided, wherein in the material preparation step, the stirring temperature is 200 to 400° C.

In one embodiment of the present invention, the method is provided, wherein in the heat treatment step, the heat treatment temperature is 700 to 900° C.

By way of the technical means adopted by the present invention, it can not only simplify the conventional manufacturing process of the biomass carbon material, but also produce a multi-porous biomass carbon material with a high surface area, specifically enhancing the economic value of the product.

BRIEF DESCRIPTION OF THE DRAWINGS

FIG. 1 is a flow chart illustrating a method of manufacturing a multi-porous biomass carbon material according to an embodiment of the present invention.

DETAILED DESCRIPTION OF THE PREFERRED EMBODIMENTS

The preferred embodiments of the present invention are described in detail below with reference to FIG. 1. The description is used for explaining the embodiments of the present invention only, but not for limiting the scope of the claims.

As shown in FIG. 1, in an embodiment of the present invention, a method of manufacturing a multi-porous biomass carbon material comprises: a material preparation step S1 of preparing a raw material mixture by evenly mixing a biomass carbon source and an oxidant at a stirring temperature, wherein the biomass carbon source is glucose or lignin, and the oxidant is potassium nitrate or ammonium nitrate.

As shown in FIG. 1, in the embodiment of the present invention, the method of manufacturing the multi-porous biomass carbon material comprises: a reduction-oxidation step S2 of heating the raw material mixture in an oxygen-deficient environment to cause the raw material mixture to spontaneously combust upon heating, thereby making the raw material mixture undergo a reduction-oxidation reaction to obtain an original product.

As shown in FIG. 1, in the embodiment of the present invention, the method of manufacturing the multi-porous biomass carbon material further comprises, between the material preparation step S1 and the reduction-oxidation step S2, a cooling-shaping step S11 of cooling and shaping the raw material mixture by putting the raw material mixture into a quartz tube to obtain a cooled-shaped raw material mixture, and wherein in the reduction-oxidation step S2, the cooled-shaped raw material mixture undergoes the reduction-oxidation reaction to obtain the original product.

As shown in FIG. 1, in the embodiment of the present invention, the method of manufacturing the multi-porous biomass carbon material comprises: a first-pickling-drying step S3 of pickling the original product to obtain a first-pickling product, washing the first-pickling product with deionized water to a neutral pH value, and then performing a drying treatment thereon to obtain a dried product.

As shown in FIG. 1, in the embodiment of the present invention, the method of manufacturing the multi-porous biomass carbon material further comprises, between the reduction-oxidation step S2 and the first-pickling-drying step S3, a grinding step S21 of grinding the original product to obtain a ground product, and wherein in the first-pickling-drying step S3, the ground product is pickled to obtain the first-pickling product, which is then dried to obtain the dried product.

As shown in FIG. 1, in the embodiment of the present invention, the method of manufacturing the multi-porous biomass carbon material comprises: a heat treatment step S4 of heating the dried product at a heat treatment temperature in an oxygen-deficient environment to remove residual volatile components of the dried product, thereby obtaining a volatile-component-removed product.

As shown in FIG. 1, in the embodiment of the present invention, the method of manufacturing the multi-porous biomass carbon material comprises: a second-pickling-drying step S5 of pickling the volatile-component-removed product to obtain a second-pickling product, washing the second-pickling product with deionized water to a neutral pH value, and then performing the drying treatment thereon to make the second-pickling product become the multi-porous biomass carbon material.

As shown in FIG. 1, in the embodiment of the present invention, the method of manufacturing the multi-porous biomass carbon material is provided, wherein in the material preparation step S1, the biomass carbon source and the oxidant are evenly mixed in a manner of direct mixing of powder or in a manner of solvent-assisted mixing to obtain the raw material mixture, wherein water or alcohol is used as a solvent in the manner of solvent-assisted mixing.

In the embodiment of the present invention, the method of manufacturing the multi-porous biomass carbon material is provided, wherein the mass percentage concentration of the biomass carbon source of the raw material mixture is 10-90 wt % and the oxidant of the raw material mixture is 10-90 wt %.

As shown in FIG. 1, in the embodiment of the present invention, the method of manufacturing the multi-porous biomass carbon material is provided, wherein in the material preparation step S1, the stirring temperature is 200 to 400° C.

As shown in FIG. 1, in the embodiment of the present invention, the method of manufacturing the multi-porous biomass carbon material is provided, wherein in the heat treatment step S4, the heat treatment temperature is 700 to 900° C.

Specifically, in the embodiments of the present invention, experiments are generally performed according to the different ratios of the mass percentage concentration of the raw material mixture in the following embodiment: embodiment 1, embodiment 2, embodiment 3, embodiment 4, and embodiment 5, respectively:

Embodiment 1

In the material preparation step S1, glucose is used as the biomass carbon source and potassium nitrate is used as the oxidant, and 93.26 g of the raw material mixture is obtained by evenly mixing at the stirring temperature of 230° C. in the ratio of 50 wt % glucose and 50 wt % potassium nitrate by the mass percentage concentration. In the cooling-shaping step S11, the raw material mixture is put into the quartz tube for cooling and shaping to obtain the cooled-shaped raw material mixture. In the reduction-oxidation step S2, a steady nitrogen flow (nitrogen flow rate: 820 SCCM (Standard Cubic Centimeter per Minute)) is introduced to form the oxygen-deficient environment, and the cooled-shaped raw material mixture is heated in the oxygen-deficient environment so that the cooled-shaped raw material mixture undergoes spontaneous combustion after being heated. After the spontaneous combustion of the cooled-shaped raw material mixture upon heating, the heating is stopped and the reduction-oxidation reaction is performed by the spontaneous combustion of the cooled-shaped raw material mixture to obtain the original product, wherein, a steady nitrogen flow is continuously introduced during the reduction-oxidation reaction, and the original product is taken out after the ambient temperature is cooled to room temperature. In the grinding step S21, the original product is ground to obtain the ground product. In the first-pickling-drying step S3, the ground product is pickled with 35 wt % of hydrochloric acid by the mass percentage concentration to obtain the first-pickling product. Then, the first-pickling product is washed with deionized water to a neutral pH value and is dried at a temperature of 105° C. until the next day to obtain the dried product. In the heat treatment step S4, the dried product is put into a crucible and a steady nitrogen flow (nitrogen flow rate: 5542 SCCM) is introduced to form the oxygen-deficient environment, and the dried product is heated and forged at the heat treatment temperature of 800° C. for 2 hours to remove residual volatile components of the dried product, thereby obtaining a volatile-component-removed product. In the second-pickling-drying step S5, the volatile-component-removed product is pickled with 35 wt % of hydrochloric acid by the mass percentage concentration to obtain the second-pickling product, and then the second-pickling product is washed with deionized water to a neutral pH value and is dried at a temperature of 105° C. until the next day so that the second-pickling product becomes the multi-porous biomass carbon material, wherein the weight of the multi-porous biomass carbon material obtained is 1.315 g, and the surface area measured by a surface area and porosimetry analyzer (BET) is 2526.74 m$^2$/g.

Specifically, the hydrochloric acid with a concentration of 35 wt % used in the first-pickling-drying step S3 and the second-pickling-drying step S5 can also be replaced by other acid solutions, so as to pickle the target object.

Embodiment 2

In the material preparation step S1, glucose is used as the biomass carbon source and potassium nitrate is used as the oxidant, and 61.86 g of the raw material mixture is obtained by evenly mixing at the stirring temperature of 230° C. in the ratio of 80 wt % glucose and 20 wt % potassium nitrate by the mass percentage concentration. In the cooling-shaping step S11, the raw material mixture is put into the quartz tube for cooling and shaping to obtain the cooled-shaped raw material mixture. In the reduction-oxidation step S2, a steady nitrogen flow (nitrogen flow rate: 281 SCCM) is introduced to form the oxygen-deficient environment, and the cooled-shaped raw material mixture is heated in the oxygen-deficient environment so that the cooled-shaped raw material mixture undergoes spontaneous combustion after being heated. Since the raw material mixture in this mass percentage concentration ratio is not easy to spontaneous combustion, it is necessary to continue heating after the raw material mixture spontaneously combusts, the reduction-oxidation reaction is performed by the spontaneous combustion of the cooled-shaped raw material mixture to obtain the original product. In the grinding step S21, the original product is ground to obtain the ground product. In the first-pickling-drying step S3, the ground product is pickled with 35 wt % of hydrochloric acid by the mass percentage concentration to obtain the first-pickling product. Then, the first-pickling product is washed with deionized water to a neutral pH value and is dried at a temperature of 105° C. until the next day to obtain the dried product. In the heat treatment step S4, the dried product is put into a crucible and a steady nitrogen flow (nitrogen flow rate: 5542 SCCM) is introduced to form the oxygen-deficient environment, and the dried product is heated and forged at the heat treatment temperature of 800° C. for 2 hours to remove residual volatile components of the dried product, thereby obtaining a volatile-component-removed product. In the second-pickling-drying step S5, the volatile-component-removed product is pickled with 35 wt % of hydrochloric acid by the mass percentage concentration to obtain the second-pickling product, and then the second-pickling product is washed with deionized water to a neutral pH value and is dried at a temperature of 105° C. until the next day so that the second-pickling product becomes the multi-porous biomass carbon material, wherein the weight of the multi-porous biomass carbon material obtained is 2.612 g, and the surface area measured by BET is 549.34 m²/g.

Embodiment 3

In the material preparation step S1, glucose is used as the biomass carbon source and potassium nitrate is used as the oxidant, and 76.60 g of the raw material mixture is obtained by evenly mixing at the stirring temperature of 230° C. in the ratio of 70 wt % glucose and 30 wt % potassium nitrate by the mass percentage concentration. In the cooling-shaping step S11, the raw material mixture is put into the quartz tube for cooling and shaping to obtain the cooled-shaped raw material mixture. In the reduction-oxidation step S2, a steady nitrogen flow (nitrogen flow rate: 281 SCCM) is introduced to form the oxygen-deficient environment, and the cooled-shaped raw material mixture is heated in the oxygen-deficient environment so that the cooled-shaped raw material mixture undergoes spontaneous combustion after being heated. After the spontaneous combustion of the cooled-shaped raw material mixture upon heating, the heating is stopped and the reduction-oxidation reaction is performed by the spontaneous combustion of the cooled-shaped raw material mixture to obtain the original product, wherein, a steady nitrogen flow is continuously introduced during the reduction-oxidation reaction, and the original product is taken out after the ambient temperature is cooled to room temperature. In the grinding step S21, the original product is ground to obtain the ground product. In the first-pickling-drying step S3, the ground product is pickled with 35 wt % of hydrochloric acid by the mass percentage concentration to obtain the first-pickling product. Then, the first-pickling product is washed with deionized water to a neutral pH value and is dried at a temperature of 105° C. until the next day to obtain the dried product. In the heat treatment step S4, the dried product is put into a crucible and a steady nitrogen flow (nitrogen flow rate: 5542 SCCM) is introduced to form the oxygen-deficient environment, and the dried product is heated and forged at the heat treatment temperature of 800° C. for 2 hours to remove residual volatile components of the dried product, thereby obtaining a volatile-component-removed product. In the second-pickling-drying step S5, the volatile-component-removed product is pickled with 35 wt % of hydrochloric acid by the mass percentage concentration to obtain the second-pickling product, and then the second-pickling product is washed with deionized water to a neutral pH value and is dried at a temperature of 105° C. until the next day so that the second-pickling product becomes the multi-porous biomass carbon material, wherein the weight of the multi-porous biomass carbon material obtained is 4.85 g, and the surface area measured by BET is 763.61 m²/g.

Embodiment 4

In the material preparation step S1, glucose is used as the biomass carbon source and potassium nitrate is used as the oxidant, and 54.75 g of the raw material mixture is obtained by evenly mixing at the stirring temperature of 230° C. in the ratio of 60 wt % glucose and 40 wt % potassium nitrate by the mass percentage concentration. In the cooling-shaping step S11, the raw material mixture is put into the quartz tube for cooling and shaping to obtain the cooled-shaped raw material mixture. In the reduction-oxidation step S2, a steady nitrogen flow (nitrogen flow rate: 402 SCCM) is introduced to form the oxygen-deficient environment, and the cooled-shaped raw material mixture is heated in the oxygen-deficient environment so that the cooled-shaped raw material mixture undergoes spontaneous combustion after being heated. After the spontaneous combustion of the cooled-shaped raw material mixture upon heating, the heating is stopped and the reduction-oxidation reaction is performed by the spontaneous combustion of the cooled-shaped raw material mixture to obtain the original product, wherein, a steady nitrogen flow is continuously introduced during the reduction-oxidation reaction, and the original product is taken out after the ambient temperature is cooled to room temperature. In the grinding step S21, the original product is ground to obtain the ground product. In the first-pickling-drying step S3, the ground product is pickled with 35 wt % of hydrochloric acid by the mass percentage concentration to obtain the first-pickling product. Then, the first-pickling product is washed with deionized water to a neutral pH value and is dried at a temperature of 105° C. until the next day to obtain the dried product. In the heat treatment step S4, the dried product is put into a crucible and a steady nitrogen flow (nitrogen flow rate: 5542 SCCM) is introduced to form the oxygen-deficient environment, and the dried product is heated and forged at the heat treatment temperature of 800° C. for 2 hours to remove residual volatile components of the dried product, thereby obtaining a volatile-component-removed product. In the second-pickling-drying step S5, the volatile-component-removed product is pickled with 35 wt % of hydrochloric acid by the mass percentage concentration to obtain the second-pickling product, and then the second-pickling product is washed with deionized water to a neutral pH value and is dried at a temperature of 105° C. until the next day so that the second-pickling product becomes the multi-porous biomass carbon material, wherein the weight of the multi-porous biomass carbon material obtained is 2.42 g, and the surface area measured by BET is 1599.41 m²/g.

Embodiment 5

In the material preparation step S1, glucose is used as the biomass carbon source and potassium nitrate is used as the oxidant, and 129.58 g of the raw material mixture is obtained by evenly mixing at the stirring temperature of 230° C. in the ratio of 50 wt % glucose and 50 wt % potassium nitrate by the mass percentage concentration. In the cooling-shaping step S11, the raw material mixture is put into the quartz tube for cooling and shaping to obtain the cooled-shaped raw material mixture. In the reduction-oxidation step S2, a steady nitrogen flow (nitrogen flow rate: 653 SCCM) is introduced to form the oxygen-deficient environment, and the cooled-shaped raw material mixture is heated in the oxygen-deficient environment so that the cooled-shaped raw material mixture undergoes spontaneous combustion after being heated. After the spontaneous combustion of the cooled-shaped raw material mixture upon heating, the heating is stopped and the reduction-oxidation reaction is performed by the spontaneous combustion of the cooled-shaped raw material mixture to obtain the original product, wherein, a steady nitrogen flow is continuously introduced during the reduction-oxidation reaction, and the original product is taken out after the ambient temperature is cooled to room temperature. In the grinding step S21, the original product is ground to obtain the ground product. In the first-pickling-drying step S3, the ground product is pickled with 35 wt % of hydrochloric acid by the mass percentage concentration to obtain the first-pickling product. Then, the first-pickling product is washed with deionized water to a neutral pH value and is dried at a temperature of 105° C. until the next day to obtain the dried product. In the heat treatment step S4, the dried product is put into a crucible and a steady nitrogen flow (nitrogen flow rate: 5542 SCCM) is introduced to form the oxygen-deficient environment, and the dried product is heated and forged at the heat treatment temperature of 800° C. for 2 hours to remove residual volatile components of the dried product, thereby obtaining a volatile-component-removed product. In the second-pickling-drying step S5, the volatile-component-removed product is pickled with 35 wt % of hydrochloric acid by the mass percentage concentration to obtain the second-pickling product, and then the second-pickling product is washed with deionized water to a neutral pH value and is dried at a temperature of 105° C. until the next day so that the second-pickling product becomes the multi-porous biomass carbon material, wherein the weight of the multi-porous biomass carbon material obtained is 1.62 g, and the surface area measured by BET is 2124.05 m²/g.

Specifically, the above-mentioned embodiments, the present invention uses the biomass carbon source and the oxidant (e.g., potassium nitrate) with high oxygen content that can be oxidized autonomously and has the characteristics of activating carbon materials at high temperature, so that, during the manufacturing process of the multi-porous biomass carbon material, the surface area of the product (i.e., the multi-porous biomass carbon material of the present invention) can be easily adjusted by adjusting the ratio of the oxidant. The conventional manufacturing process of high-surface carbon material requires multiple steps of heating and cooling as well as high-cost and complex activation techniques. Therefore, compared with the conventional manufacturing process of high-surface carbon material, the method of manufacturing the multi-porous biomass carbon material of the present invention is significantly simpler than the conventional techniques.

By the technical means adopted by the method of manufacturing the multi-porous biomass carbon material of the present invention, not only the conventional manufacturing process of biomass carbon material can be simplified, but also the multi-porous biomass carbon material with a high surface area can be produced. Compared with conventional active charcoal, the multi-porous biomass carbon material has a higher and faster mass transfer rate and can be made into electrodes for supercapacitors or lithium-ion capacitors, thus enhancing the economic value of biomass carbon material.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A method of manufacturing a multi-porous biomass carbon material, comprising:
   a material preparation step of preparing a raw material mixture by evenly mixing a biomass carbon source and an oxidant at a stirring temperature, wherein the biomass carbon source is glucose or lignin, and the oxidant is potassium nitrate or ammonium nitrate;
   a reduction-oxidation step of heating the raw material mixture in an oxygen-deficient environment to cause the raw material mixture to spontaneously combust upon heating, thereby making the raw material mixture undergo a reduction-oxidation reaction to obtain an original product;
   a first-pickling-drying step of pickling the original product to obtain a first-pickling product, washing the first-pickling product with deionized water to a neutral pH value, and then performing a drying treatment thereon to obtain a dried product;
   a heat treatment step of heating the dried product at a heat treatment temperature in an oxygen-deficient environment to remove residual volatile components of the dried product, thereby obtaining a volatile-component-removed product; and
   a second-pickling-drying step of pickling the volatile-component-removed product to obtain a second-pickling product, washing the second-pickling product with deionized water to a neutral pH value, and then performing the drying treatment thereon to make the second-pickling product become the multi-porous biomass carbon material.

2. The method as claimed in claim 1, further comprising, between the material preparation step and the reduction-oxidation step, a cooling-shaping step of cooling and shaping the raw material mixture by putting the raw material mixture into a quartz tube to obtain a cooled-shaped raw material mixture, and wherein in the reduction-oxidation step, the cooled-shaped raw material mixture undergoes the reduction-oxidation reaction to obtain the original product.

3. The method as claimed in claim 1, further comprising, between the reduction-oxidation step and the first-pickling-drying step, a grinding step of grinding the original product to obtain a ground product, and wherein in the first-pickling-drying step, the ground product is pickled to obtain the first-pickling product, which is then dried to obtain the dried product.

4. The method as claimed in claim 2, further comprising, between the reduction-oxidation step and the first-pickling-drying step, a grinding step of grinding the original product to obtain a ground product, and wherein in the first-pickling-drying step, the ground product is pickled to obtain the first-pickling product, which is then dried to obtain the dried product.

5. The method as claimed in claim 1, wherein in the material preparation step, the biomass carbon source and the oxidant are evenly mixed in a manner of direct mixing of powder or in a manner of solvent-assisted mixing to obtain the raw material mixture, wherein water or alcohol is used as a solvent in the manner of solvent-assisted mixing.

6. The method as claimed in claim 1, wherein the mass percentage concentration of the biomass carbon source of the raw material mixture is 10-90 wt % and the oxidant of the raw material mixture is 10-90 wt %.

7. The method as claimed in claim 1, wherein in the material preparation step, the stirring temperature is 200 to 400° C.

8. The method as claimed in claim 1, wherein in the heat treatment step, the heat treatment temperature is 700 to 900° C.

\* \* \* \* \*